United States Patent
Achir et al.

(10) Patent No.: US 8,601,350 B2
(45) Date of Patent: Dec. 3, 2013

(54) METHOD, DEVICE AND COMPUTER-READABLE STORAGE MEDIUM FOR CONFIGURING AN OVERALL ENCODING/DECODING SCHEME IN A COMMUNICATIONS NETWORK

(75) Inventors: Mounir Achir, Chantepie (FR); Philippe Le Bars, Thorigne Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 13/114,783

(22) Filed: May 24, 2011

(65) Prior Publication Data

US 2011/0296280 A1 Dec. 1, 2011

(30) Foreign Application Priority Data

May 27, 2010 (FR) ...................................... 10 54111

(51) Int. Cl.
*H03M 13/00* (2006.01)
(52) U.S. Cl.
USPC ......................................................... 714/776
(58) Field of Classification Search
USPC ............ 714/776, 712, 755, 801, 799, 4.5, 43; 375/341
See application file for complete search history.

(56) References Cited

U.S. PATENT DOCUMENTS

| | | | |
|---|---|---|---|
| 8,335,970 B2 * | 12/2012 | Seshadri et al. | 714/776 |
| 2002/0041640 A1 | 4/2002 | Le Bars et al. | |
| 2008/0025204 A1 * | 1/2008 | Radha et al. | 370/216 |
| 2008/0117904 A1 | 5/2008 | Radha et al. | |
| 2008/0219251 A1 * | 9/2008 | Xue et al. | 370/389 |
| 2009/0252146 A1 * | 10/2009 | Luo et al. | 370/351 |

OTHER PUBLICATIONS

Sengupta, et al. "An Analysis of Wireless Network Coding for Unicast Sessions: The Case for Coding-Aware Routing", XP002540162, Aug. 2009, EP.

* cited by examiner

*Primary Examiner* — Phung M Chung
(74) *Attorney, Agent, or Firm* — Canon U.S.A., Inc., IP Division

(57) ABSTRACT

A method is provided for configuring an overall encoding scheme comprising a first encoding for generating first encoded packets from source packets and a second encoding for generating second encoded packets by combination of first encoded packets according to a combination scheme applied by predetermined nodes of the network. The method obtains a number N of defective paths among paths used to transmit the first and second encoded packets to at least one destination node, a path being defective if an associated quality of transmission is below a predetermined threshold. A combination scheme is selected from among at least two possible predetermined combination schemes for which a number of encoded second packets is greater than or equal to N.

9 Claims, 9 Drawing Sheets

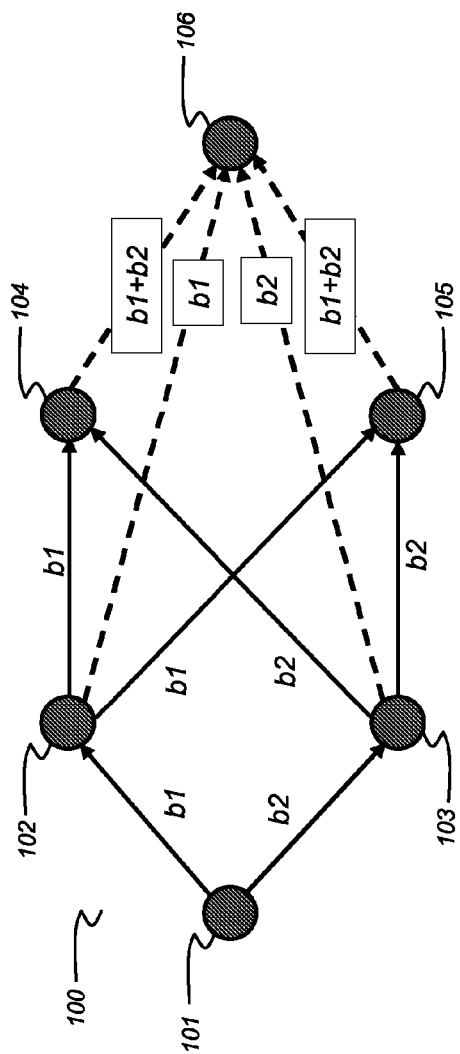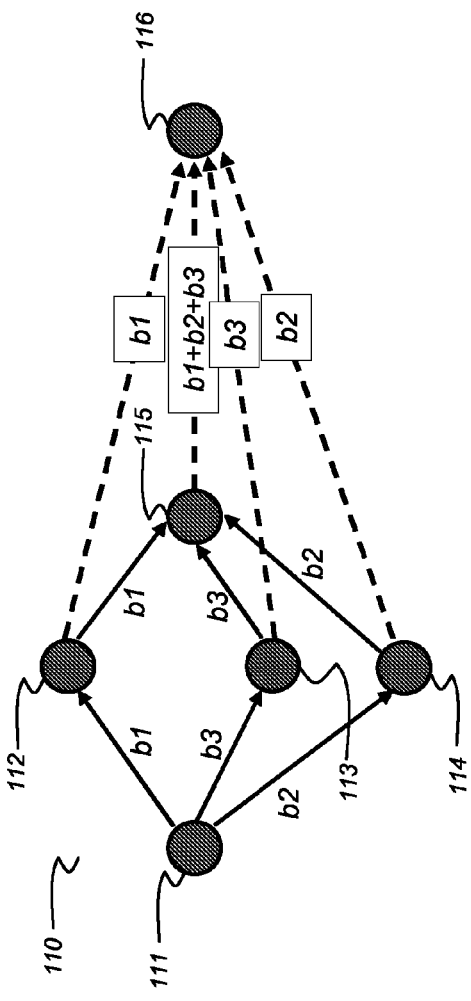
Figure 1a
Figure 1b

METHOD, DEVICE AND COMPUTER-READABLE STORAGE MEDIUM FOR CONFIGURING AN OVERALL ENCODING/DECODING SCHEME IN A COMMUNICATIONS NETWORK

CROSS-REFERENCE TO RELATED APPLICATIONS

This application claims the benefit under 35 U.S.C. §119 (a)-(d) of French Patent Application No. 1054111, filed on May 27, 2010 and entitled "Method and device for configuring an overall encoding/decoding scheme in a communications network, corresponding computer program product and storage means".

The above cited patent application is incorporated herein by reference in its entirety.

BACKGROUND OF THE INVENTION

1. Field of the Invention

The present invention relates to implementing error correcting codes and a network coding scheme within a communications network.

More specifically, the invention pertains to the implementing of such error correcting codes and network coding in the context of the transmission of data packets in a meshed communication network.

2. Description of the Related Art

Certain wireless communication networks jointly use an error correcting code, for example of an LDPC (Low Density Parity Check Code) type, as well as network coding scheme (network coding scheme corresponds to the packet-combining operation performed by the nodes of the network).

The present invention is not limited to this particular field of application but can be used in any type of network jointly using a linear error correcting code as well as network coding scheme.

In a wireless meshed communication network, the time division multiple access (TDMA) mode is often used to enable the nodes included in said network to transmit data (through data packets sent within a superframe). The nodes send data according to a common modulation scheme, sending packets during the time slot assigned to them. It may be noted that, depending on the modulation scheme used (for example one of the following schemes: BPSK (binary phase-shift keying), QPSK (quadrature phase-shift keying), 8PSK, 16QAM (quadrature amplitude modulation), etc. . . . ) within the network, it is possible, in determining the ratio $E_b/N_o$ of the system (corresponding to the ratio of the energy per bit ($E_b$) to the spectral density of the noise ($N_o$)), to know the bit error rate or binary error rate (BER) on an additive white Gaussian noise channel (this type of channel provides a fairly good model of the real links or paths existing between the nodes of the network). For example, when the QPSK modulation scheme is used, the following relationship is verified: $BER=(\frac{1}{2}) \text{erfc} (E_b/N_o)$ where erfc is the complementary error function. It may be recalled that the signal-to-noise ratio (SNR) also denoted as S/N is equal to $(n*E_b)/(N_o*B)$ where B is the bandwidth of the signal and N is the number of bits present in the signal S. For example, here below in the description, we use only the SNR because it is easier to estimate.

Thus, by estimating the SNR of a modulation scheme, it is possible to predict the BER. It must be noted that the smaller the SNR, the greater the BER and therefore the greater the likelihood that the packet sent by the nodes will comprise many errors. In this example, it is worthwhile to use error correcting codes (to encode packets at the level of a source node) having high corrective power as well as a network coding scheme which, as a function of spatial configuration, makes it possible to convey a greater number of redundant packets to the destination node.

It may be advantageous especially (but not exclusively) in this type of network to use an LDPC code also called a Gallagher code which is a linear block code and can perform better than a turbo-code in certain conditions. Since the LDPC codes are linear codes, they are defined on the basis of their control matrix H which is generally not a systematic matrix. It may be recalled that there are two classes of LDPC codes: regular LDPC codes and irregular LDPC codes. An LDPC code is said to be regular in the particular case where the control matrix H contains a constant number of 1s in each row and a constant number of 1s in each column. If an LDPC code does not verify this property, it is said to be irregular. It turns out that it is the irregular LDPC codes that seem to have the best performance in binary-input symmetric-output memoryless channels, binary erasure channels and additive white Gaussian noise (noise modeled by a generalized Gaussian distribution) channels. Now these types of channels model existing communications links in a wireless meshed network. Thus, by using these special irregular LDPC codes in a wireless meshed communications network, Shannon's limit on these channels can be approached.

The decoding of an LDPC code is done on the same principle as that of a turbo-code, by an iterative algorithm called a belief-propagation algorithm well known to those skilled in the art.

The fact of using a network coding scheme jointly with the use of an LDPC encoding enables correction of a greater number of errors in the received packets (through packet redundancy information) than in the case of the use of only one protection technique. In particular, when the binary error rate (BER) on certain links increases, the synergy between these codes is remarkable.

Indeed, through the use of network coding scheme, a relay node may simply re-transmit a packet, create a copy of the packet after having demodulated it, correct the errors and retrieve the original payload information or else combine several packets to create a combined packet which will be transmitted. The repetition prevents a certain number of packet losses for the destination node which could result for example from the concealment of the direct line between senders and receivers in a wireless network.

It is for this reason that, in the prior art, depending on the pre-designed properties of a physical channel, those skilled in the art choose to implant a given modulation scheme for the system as well as a particular LDPC code (for example) in the nodes of the network as well as a network coding scheme, once and for all, and for the entire lifetime of the nodes.

More specifically, in a wireless communications network subjected to numerous shadowing phenomena, those skilled in the art will use a modulation scheme providing a low bit rate (thus fewer bits will be lost during interference) and error correcting codes that have high corrective power (i.e. approaching Shannon's limit) but are generally complex in terms of resources used (such as for example irregular LDPC codes). They will also use a network coding scheme which is itself an error correcting code (for example a distributed correcting code) thus creating a product code.

By contrast, in a wireless communications network subjected to little shadowing, those skilled in the art will use a modulation scheme providing a high bit rate and error correcting codes that have a lower corrective power (i.e. require fewer resources than in the previous example) and are above all less complex in their implementing (for example Reed Solomon codes). In addition they could use a network coding scheme which is not an error correcting code.

However, these approaches are not optimal when the communication network undergoes interference in varying degrees (in duration and intensity) and in a random manner.

Furthermore, another drawback of this classic technique is that it implements a sometimes excessive use of available resources in the source node, as well as in the relay nodes and in the destination node.

SUMMARY OF THE INVENTION

One aspect of the present invention is aimed especially at overcoming these different drawbacks of the prior art.

Another aspect of the present invention aims to provide an encoding technique for providing an adaptive solution that gives better results, in terms of decoding, than the above-mentioned known techniques.

Another aspect of the present invention aims to provide a technique that enables the dynamic development of the parameters linked to the protection of data (relative to errors) travelling on the communications channels of a network.

Another aspect of the present invention aims to provide a technique of this kind that uses the resources of the different nodes in an optimum manner.

In accordance with one aspect of the invention there is provided a method for configuring an overall encoding scheme comprising a first encoding for generating first encoded packets from source packets and a second encoding for generating second encoded packets by combination of first encoded packets according to a combination scheme applied by predetermined nodes of the network. This method comprises obtaining a number N of defective paths among paths used to transmit the first and second encoded packets to at least one destination node, a path being defective if an associated quality of transmission is below a predetermined threshold. The method also comprises selecting the combination scheme from among at least two possible predetermined combination schemes for which a number of encoded second packets is greater than or equal to N.

Thus, depending on the number of defective links or paths, the combination scheme is changed as the case may be in such a way that the choice enables the destination node to receive more second packets (when the disturbances in the network are greater). Consequently, the destination node has greater chances of being successful in the overall decoding (i.e. in retrieving the source packets).

Thus, because this method is dynamic, it enables the use of the network resources optimally (with respect to the choice of an adequate combination scheme).

It must be noted that depending on the topology of the network and of the defective paths, the selected scheme will not use exactly the same defective paths. Indeed, when it is decided to switch from a first combination scheme to a second combination scheme, since the defective paths are not the same (because the predetermined nodes of the first combination scheme are not necessarily the same as those used in the second combination scheme), the quality of the links or paths of the second combination scheme must nevertheless be correlated with the quality of the links or paths of the first combination scheme.

Advantageously, among the N defective paths, a number N' of defective paths is allocated to the transmission of second encoded packets but not to the transmission of first encoded packets with $s \leq N' \leq N$, where s is a predetermined threshold.

Thus, by transmitting second encoded packets (but not first encoded packets) on a certain number (N') of defective links (chosen among the N defective links opened here above) with $s \leq N' \leq N$, where s is the predetermined threshold, the risk that the packets damaged will be encoded first packets is reduced. It may be noted that the greater the predetermined threshold value s, the greater the reduction in the risk of damage to the first encoded packets.

Advantageously, the predetermined threshold s is equal to N so that the totality of the N defective paths is allocated to the transmission of second encoded packets but not to the transmission of first encoded packets.

Thus, by transmitting second encoded packets (but not first encoded packets) on the totality of the links or defective paths considered (because the predetermined threshold is equal to N), the risk that it is the first encoded packets that would be damaged is minimized optimally.

In accordance with another aspect of the present invention, there is provided a computer program product comprising program code instructions for implementing any of the above-mentioned methods when the instructions are executed on a computer.

In accordance with another aspect of the present invention there is provided a computer-readable storage medium storing a computer program comprising a set of instructions executable by a computer for implementing any of the above-mentioned methods.

In accordance with another aspect of the present invention there is provided a device for configuring an overall encoding scheme comprising a first encoding for generating first encoded packets from source packets and a second encoding for generating second encoded packets by combination of first encoded packets according to a combination scheme applied by predetermined nodes of the network. The device comprises an obtaining unit which obtains a number N of defective paths among paths used to transmit the first and second encoded packets to at least one destination node, a path being defective if an associated quality of transmission is below a predetermined threshold. The device also comprises a selecting unit which selects the combination scheme from among at least two possible predetermined combination schemes for which a number of encoded second packets is greater than or equal to N.

BRIEF DESCRIPTION OF THE DRAWINGS

FIGS. 1a and 1b each present a wireless meshed network (constituted by one or more source nodes, relay nodes and one or more destination nodes) using a distinct combination scheme;

DETAILED DESCRIPTION

Figure 2:
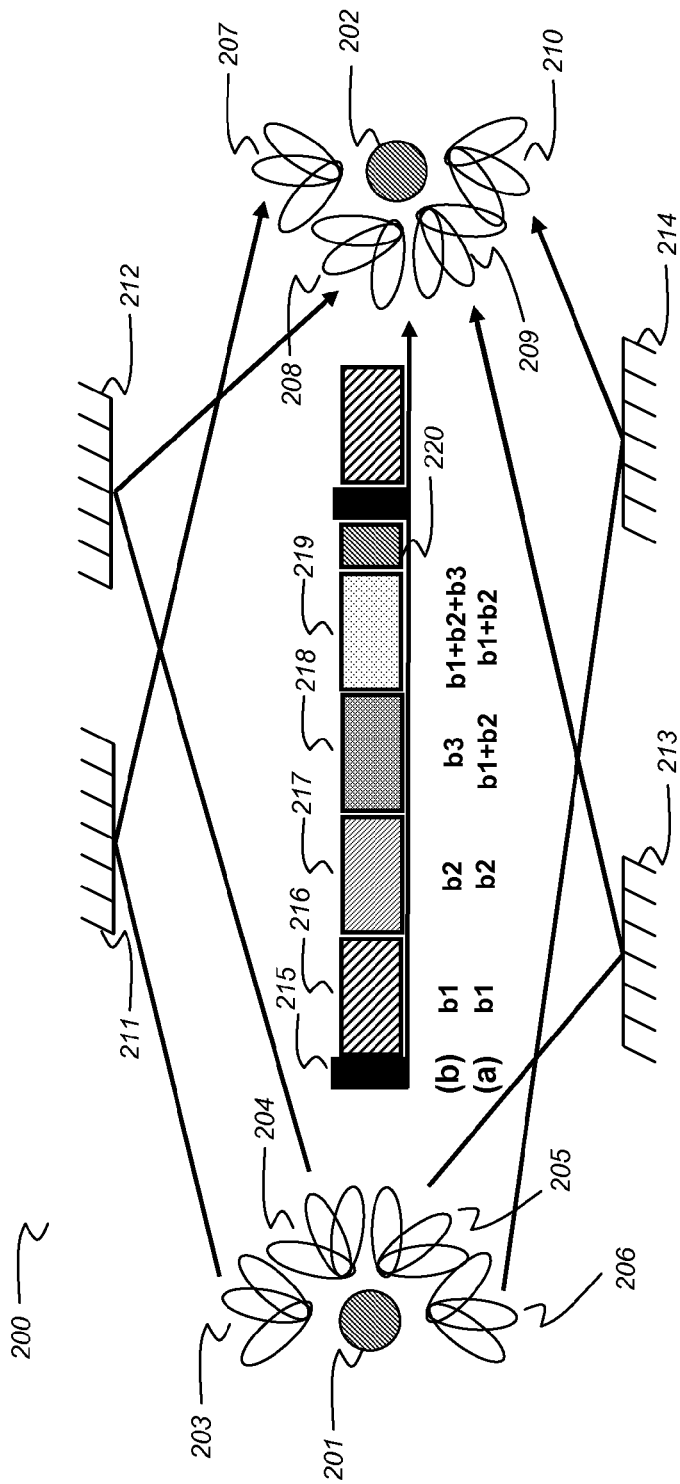
FIG. 2 describes an encoding scheme in a particular embodiment of the invention.

In the following figures, identical elements and steps are designated by a similar numerical reference.

FIG. 1 presents two wireless meshed networks consisting of one or more source nodes (101 or 111), relay nodes (102, 103, 104, 105 or 112, 113, 114, 115) and one or more destination nodes (106 or 116) employing two different combination schemes.

The network of FIG. 1a implements a first combination scheme. Through the application of this scheme, the destination node (106) receives two data packets ($b_1$ and $b_2$) and two redundancy packets ($b_1+b_2$ and $b_1+b_2$). It may be noted that the addition sign + corresponds to an "Exclusive Or" operation.

The network of FIG. 1b implements a second combination scheme. Through the application of this scheme, the destination node (116) receives three data packets ($b_1$, $b_2$ and $b_3$) and one redundancy packet ($b_1+b_2+b_3$).

The first scheme provides greater robustness to communications (in exchange for the disadvantage of a smaller payload rate) compared with the second scheme. By contrast, the second scheme provides a higher payload rate. Indeed, when the second combination scheme is used, three data packets ($b_1$, $b_2$ and $b_3$) are transmitted whereas two packets ($b_1$ and $b_2$) are transmitted when the first combination scheme is used.

It is assumed that each source packet transmitted by a source node (node 101 or 111) is encoded with an LDPC type channel encoding. However, it may be noted that other error correcting codes (such as the Reed Solomon codes) can be used.

The encoded source packets ($b_1$, $b_2$ et $b_3$) also called first encoded packets are then relayed by relay nodes either as such (relay nodes 102, 103, 112, 113 and 114) or combined (relay nodes 104, 105 and 115) depending on the combination scheme selected (as well as on the predetermined nodes of the network).

In one particular embodiment of the invention, the technique presented in this application can be applied in the case of a point-to-point communication between a source node and a destination node as illustrated in FIG. 2. The source node 201 has a smart antenna which can be configured to send the electromagnetic signal in preferred directions. The destination node 202 receives four packets each sent with a given antenna configuration (among those referenced 203, 204, 205 and 206) and reflected on the obstacles 211, 212, 213 and 214. The destination node can use either an antenna configuration for each packet received (among those referenced 207, 208, 209 and 210) or else a mode of reception in omnidirectional mode for all the packets received. A TDMA type access mode can be used to transmit the packets. The source node 201 transmits either the packets $b_1$, $b_2$, $b_3$, $b_1+b_2+b_3$, or the packets $b_1$, $b_2$, $b_1+b_2$ and $b_1+b_2$ in respectively the time slots 216, 217, 218 and 219.

In both cases of application referred to here above and illustrated by FIGS. 1a, 1b and 2, the destination node therefore receives four encoded packets (first encoded packets as well as second encoded packets) representing encoded source packets and linear combinations of encoded source packets.

The destination node (106, 116) applies an overall decoding (by using for example a belief-propagation algorithm) on the basis of the four packets received in order to apply the error correction.

FIG. 2 describes an encoding scheme in a particular embodiment of the invention. In this mode, a source node (201) applies an LDPC type encoding and transmits four packets to the destination nodes 202 during the time slots 216, 217, 218 and 219. The source node applies a combination from the encoded source packets in order to determine a combined packet which will be transmitted once to the destination node 202 during the time slot 219 or else transmitted twice in the time slots 218 and 219.

In a preferred embodiment, the combination of the packets can be done by a simple XOR operation on all the bits of the packets to be combined.

The destination node therefore receives four packets and applies a joint network and LDPC decoding on the basis of the four packets received and of a parity matrix HH (denoted HH1 for the communication mode presented in FIG. 1a and denoted as HH2 for the communication mode presented in FIG. 1b).

Let H be the parity matrix used to encode messages at the source node 201. The packets transmitted by the source node are formed by blocks. Each of these blocks is an LDPC code word denoted as b1 and b2 if the source node transmits a combined packet twice to the destination node 202 and b1, b2 and b3 when the source node transmits a single combined packet to the destination node 202. The blocks meet the following equations:

$$H \cdot b_1^T = 0$$

$$H \cdot b_2^T = 0$$

$$H \cdot b_3^T = 0$$

In the mode of transmission using two redundancy packets, the blocks of the combined packet, denoted as $b_{comb}$ are computed with the following formula: $b_1$ xor $b_2$. The overall parity matrix which can be used to decode the four received packets ($b_1$, $b_2$, $b_1+b_2$, $b_1+b_2$) is written as follows:

$$HH1 = \begin{pmatrix} H & zeros(K,N) & zeros(K,N) & zeros(K,N) \\ zeros(K,N) & H & zeros(K,N) & zeros(K,N) \\ I(N,N) & I(N,N) & I(N,N) & zeros(N,N) \\ I(N,N) & I(N,N) & zeros(N,N) & I(N,N) \end{pmatrix} \quad (1)$$

With:

N the size of the LDPC code word;

K the number of parity bits of an LDPC code word;

zeros(K,N) represents a matrix with null elements sized K×N;

zeros(N,N) represents a matrix with null elements sized N×N;

I(N,N) represents an identity matrix with an N×N matrix.

The matrix HH1 constitutes a parity matrix for the vector formed by the concatenation of the four received packets, i.e.:

$$HH1 \cdot \begin{bmatrix} b_1^T \\ b_2^T \\ b_1^T + b_2^T \\ b_1^T + b_2^T \end{bmatrix} = 0$$

In the mode of transmission using a redundancy packet, the blocks of the combined packet denoted as $b_{comb}$ are computed with the following formula: $b_1$ xor $b_2$ xor $b_3$. The overall parity matrix which may be used to decode the four received packets ($b_1$, $b_2$, $b_3$, $b_1+b_2+b_3$) is written as follows:

$$HH2 = \begin{pmatrix} H & zeros(K,N) & zeros(K,N) & zeros(K,N) \\ zeros(K,N) & H & zeros(K,N) & zeros(K,N) \\ zeros(K,N) & zeros(K,N) & H & zeros(N,N) \\ I(N,N) & I(N,N) & I(N,N) & I(N,N) \end{pmatrix}$$

The matrix HH2 is a parity matrix for the vector formed by the concatenation of the four packets received. That is to say:

$$HH2 \cdot \begin{bmatrix} b_1^T \\ b_2^T \\ b_3^T \\ b_1^T + b_2^T + b_3^T \end{bmatrix} = 0$$

Depending on the network coding scheme used, the destination node uses either the parity matrix HH1 or the parity matrix HH2. It may be noted that the destination node does not necessarily need to store the matrices HH1 and/or HH2. It may store solely the encoding matrix H and if necessary rebuild one of these matrices.

Figure 3:
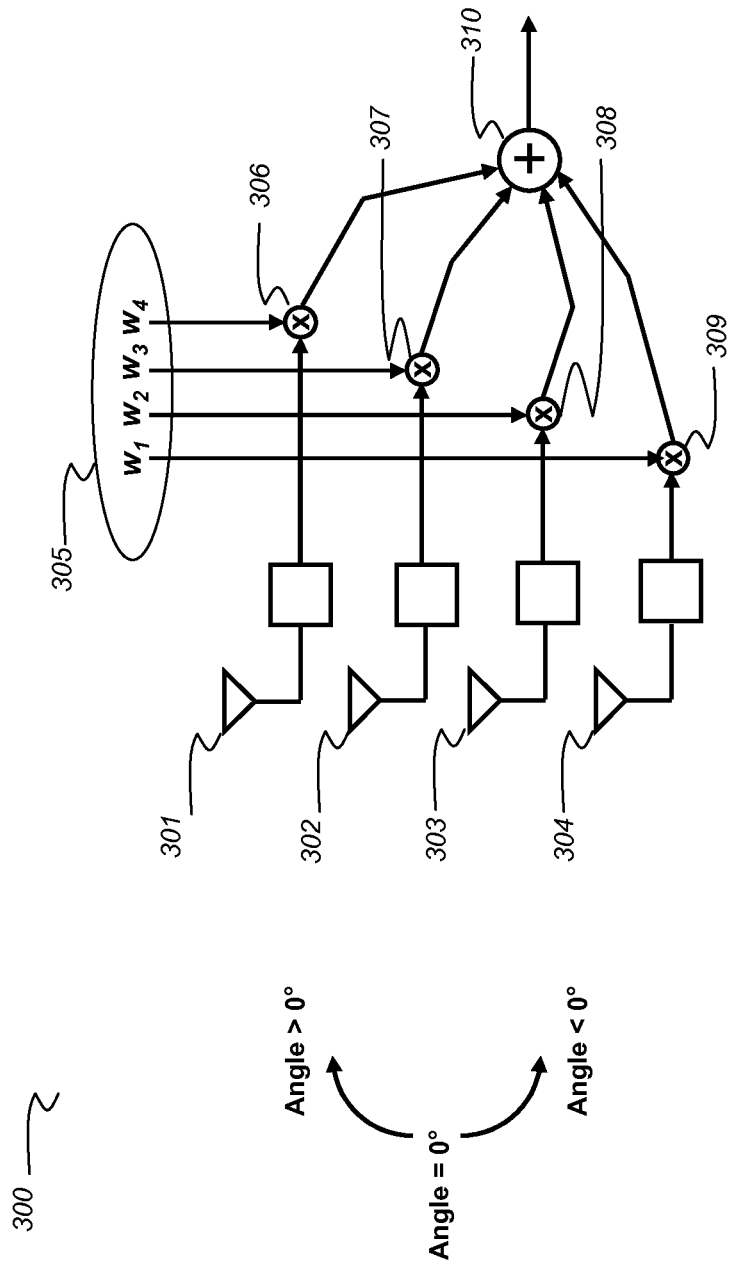
FIG. 3 presents a drawing of the principle of a four-element smart antenna.

FIG. 3 is a schematic drawing of a four-element (301, 302, 303 and 304) smart antenna. The smart antennas are used to send or receive signals coming from one or more possible directions. The directions are chosen by means of a set of complex coefficients that are applicable by the antenna and determine directions that are undesired (i.e. those to be attenuated) and directions that are desired (i.e. those that are to be amplified).

The elements of the antenna retrieve the same electromagnetic signal but in a phase-shifted state because of the distance between the elements of the antenna. The antenna applies a set of complex coefficients represented by the set 305 in multiplying each of the coefficients with the signal received by an element of the antenna (multipliers 306, 307, 308 and 309). The different signals obtained are added up with the adder 310. The overall signal will correspond to the signal coming from the desired direction or directions.

Figure 4:
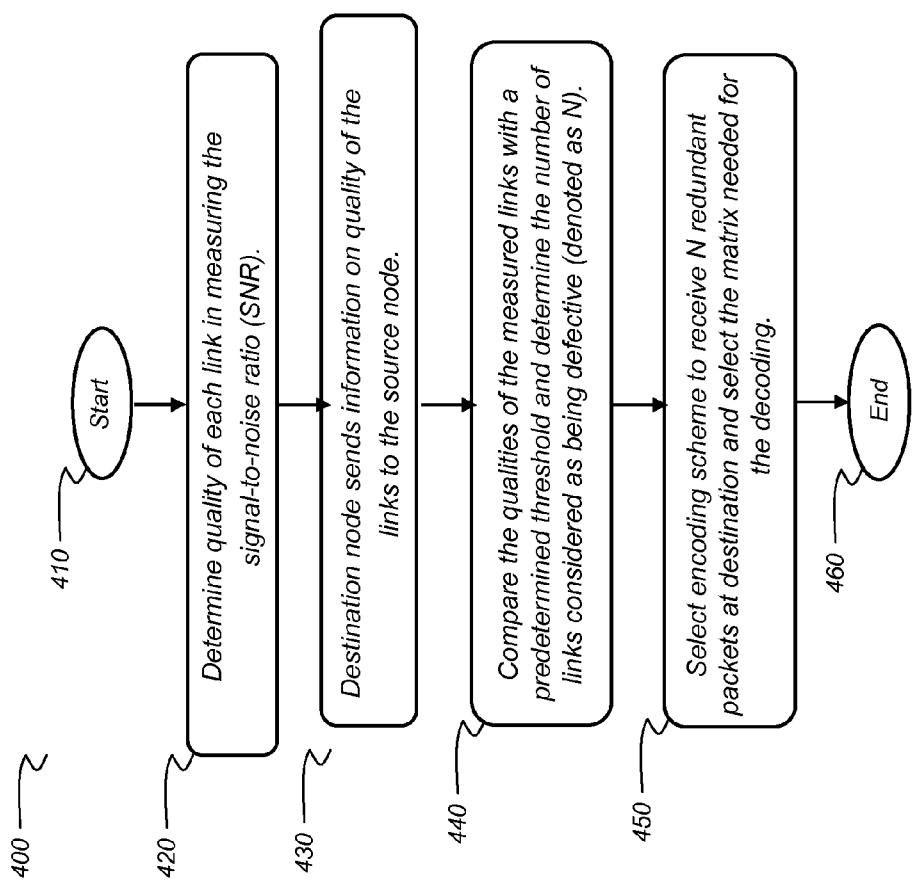
FIG. 4 is an algorithm for selecting the encoding scheme (or combination scheme) according to a particular embodiment of the invention.

FIG. 4 presents an algorithm for selecting the encoding scheme (or combination scheme) according to one particular embodiment of the invention.

The method 400 describes the different steps to be applied in order to determine the combination scheme to be used.

During the step 420 (corresponding to the method 500 (see FIG. 5)), the destination device estimates the signal-to-noise ratio of each link (or path) between the source node and the destination node. The destination node then transmits the information on quality to the source node (step 430) in using the time slot 807. From this information, the step 440 is used to determine the number of links having a quality considered to be insufficient by means of the method 600 (see FIG. 6).

The step 450 is used to select the combination scheme having a number of redundancy packets equal to the number of links or paths having insufficient quality.

Figure 5:
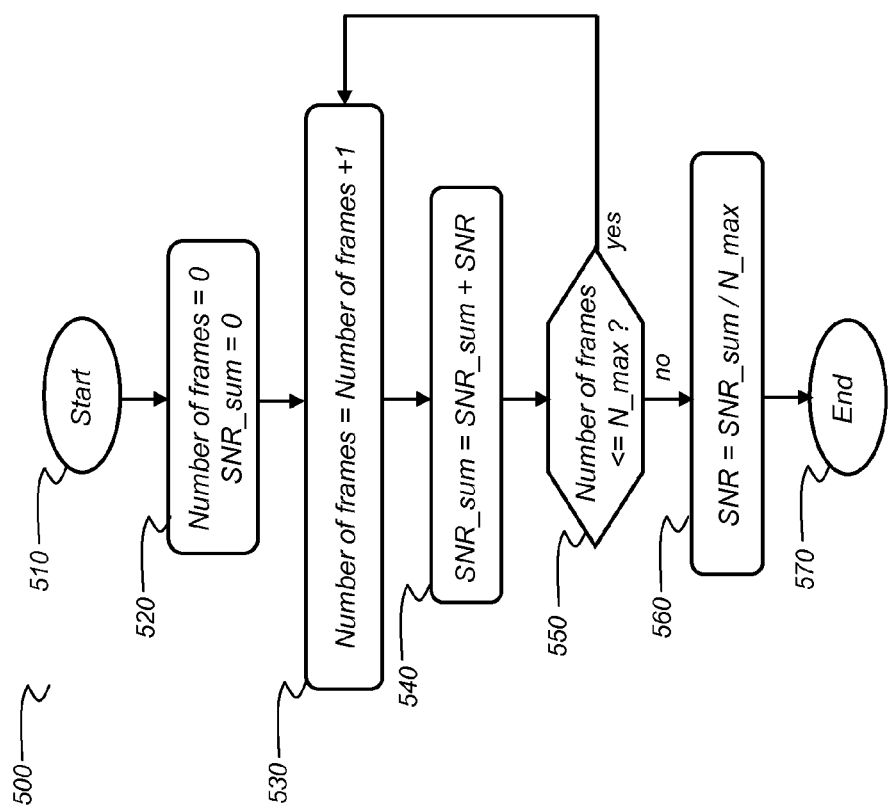
FIG. 5 which provides a detailed description of the step 420 of FIG. 4 is an algorithm for estimating the mean signal-to-noise ratio for a sample (of predefined size) of data packets received.

FIG. 5 which gives a detailed description of the step 420 of FIG. 4 is an algorithm for estimating the mean signal-to-noise ratio for a sample (of predefined size) of received data packets.

This method can be implemented in a particular embodiment of the invention in a destination node and executed whenever a data packet is received.

During the step 520, the destination node initializes a variable corresponding to the number of packets received as well as a variable corresponding to the sum of the SNR values measured at zero.

During the step 530, the variable corresponding to the number of packets received is incremented by one (following the reception of a packet).

During the step 540, the values of SNR measured for each received packet are added up.

The step 550 is a step for comparing the value of the variable corresponding to the number of packets received with a predetermined packet N_max. If the value of the variable corresponding to the number of received packets is equal to a predetermined number N_max, then the step 560 is executed and it gives the value of the mean SNR. If not, the operation returns to the step 530.

In order to estimate the mean SNR (at the step 540), a technique well known to those skilled in the art and described in the US patent document 2002/0041640 can be used.

According to this technique, an estimation of the noise of the transmission channel, denoted as B, is obtained by adding up the measurements of the deviation of the power of each symbol received relative to a theoretical value. This theoretical value corresponds to the power of the symbol having the smallest distance relative to the received symbol. The result is divided by the number of symbols considered. This corresponds to the application of the criterion of maximum likelihood which likens a received signal to its closest neighbor in terms of distance. The equation thus obtained is the following:

$$B = \frac{\sum_{i=1}^{k} \min_i [(S_i^* - S_i)^2]}{k}$$

where i is an integer, k designates the number of symbols per data packet, min designates the smallest Euclidian distance between a received signal and a theoretical point of the constellation (of the modulation), "Si*" designates the position of the received signal and Si designates the position of the theoretical symbol.

When the computation of the channel noise after reception of a data packet has been done, the signal-to-noise ratio can be estimated by dividing the mean power per symbol by the power of the noise computed according to the preceding equation. The formula giving the mean SNR is written as follows:

$$SNR = \frac{\sum_{i=1}^{k}(S_i^*)^2}{B \cdot k}$$

Figure 6:
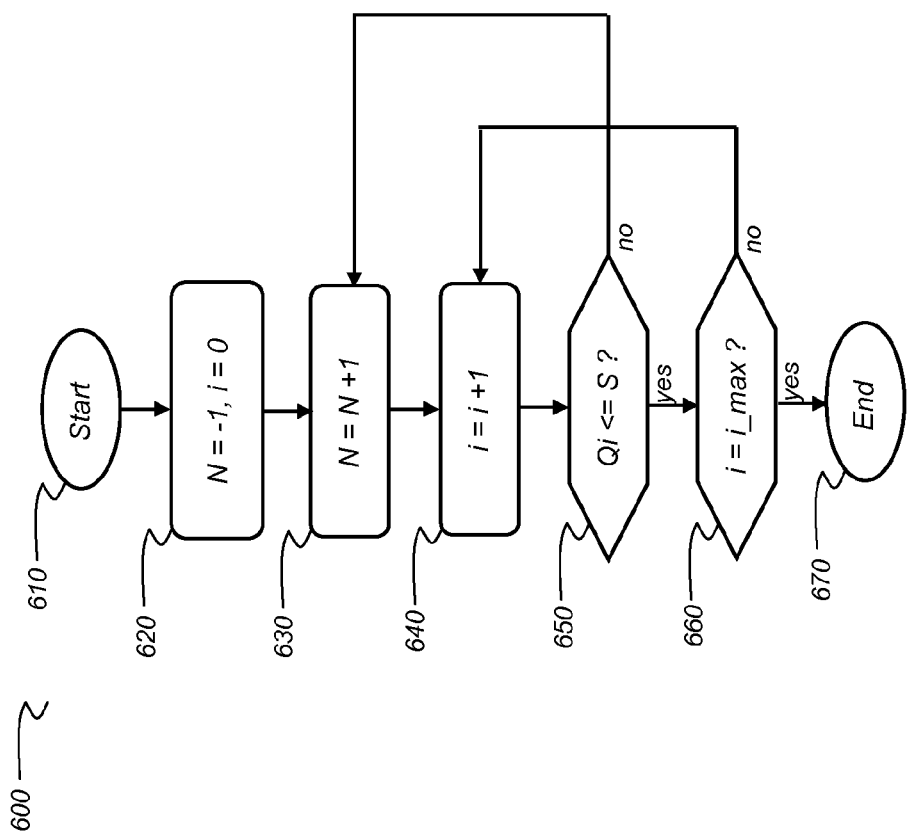
FIG. 6 which provides a detailed description of the step 440 of FIG. 4, presents an algorithm for computing the number of links or paths having insufficient quality (also called defective paths)

FIG. 6 which describes the step 440 of FIG. 4 in detail, presents an algorithm for computing the number of links or paths having inadequate quality (also called defective paths).

At the step 620, variables (denoted as N and i) are respectively initialized at −1 and 0. The variable N corresponds to the number of defective paths and the variable i corresponds to the number of tested paths.

At the step 630, the variable N is incremented by 1.

At the step 640, the variable i is incremented by 1.

At the step 650, the quality of the path i (between the source node and the destination node) (i.e. the mean SNR estimated with the method 500) is compared with a predetermined threshold denoted as S.

If the estimated mean SNR is smaller than or equal to said threshold S, then the operation passes to the step 660. If not, it returns to the step 630.

At the step 660, the value of the variable i is compared with the total number of paths (i_max). If the variables are equal, then the set of paths has been processed and the operation passes to the step 670 (end). If not, it returns to the step 640.

At the end of the method, the value of the variable N gives the number of links having insufficient quality.

Figure 7:
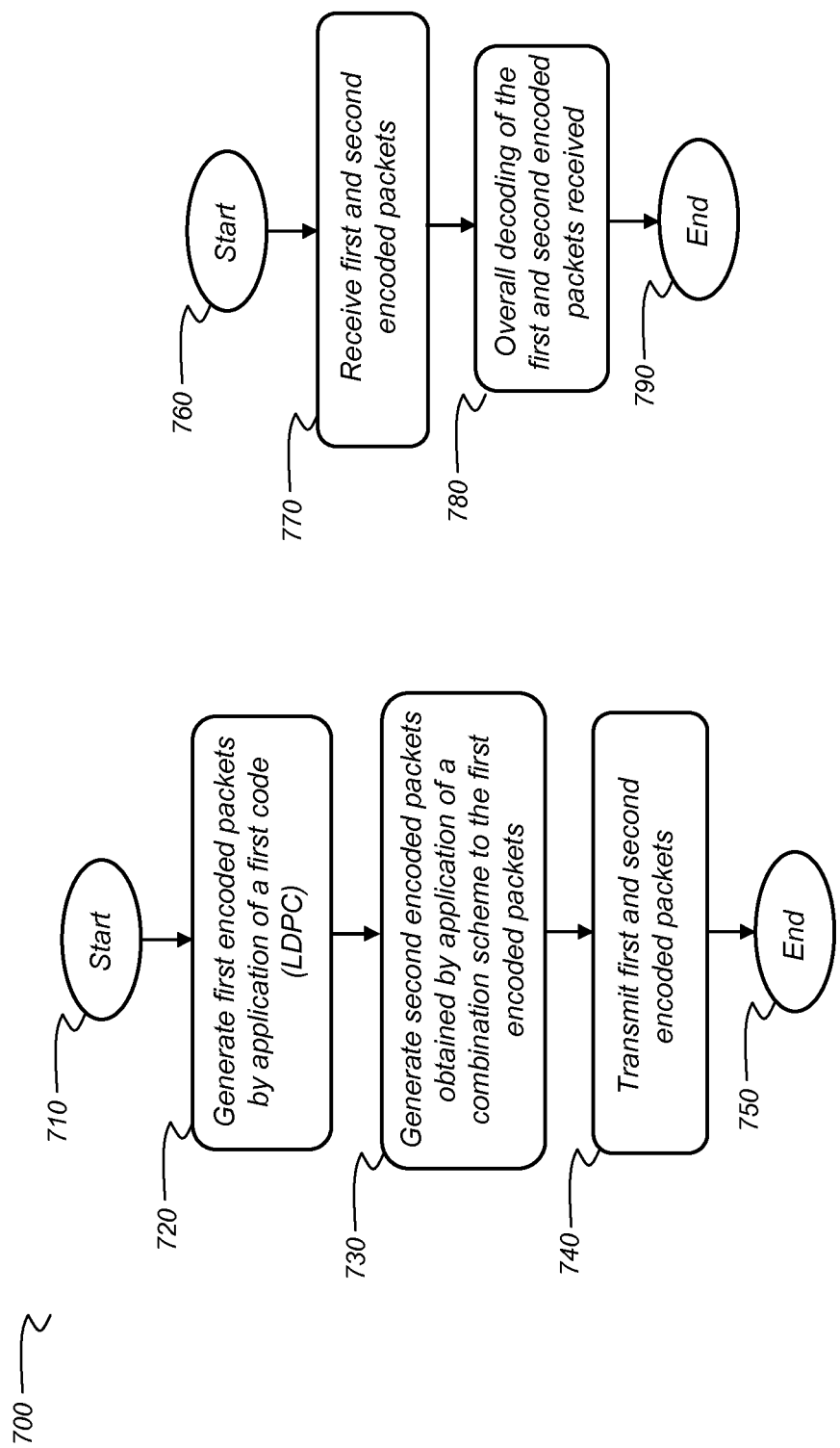
FIGS. 7a and 7b respectively provide a detailed description of a method for encoding and a method for decoding first and second data packets.

FIG. 7a presents a method for encoding first and second packets.

The encoding of the packets takes place in two parts. Indeed, during the step 720 first encoded packets are generated by applying an LDPC type encoding. These first packets correspond to the packets $b_1$ and $b_2$ in the communications mode with two redundancy packets (cf. FIG. 1a) and the packets $b_1$, $b_2$ and $b_3$ in the communications mode with one redundancy packet (cf. FIG. 1b).

Then, during the step 730, a second encoding (or combination scheme) is applied to the first encoded packets in order to generate second encoded packets (or combined packets).

Finally, during the step 740, the first and second encoded packets are transmitted.

FIG. 7b presents a method for decoding first and second encoded packets. The destination node receives first and second encoded packets (step 770) and applies an overall decoding (step 780) by using either the parity matrix HH1 or the parity matrix HH2 as a function of the combination scheme chosen.

Figure 8:
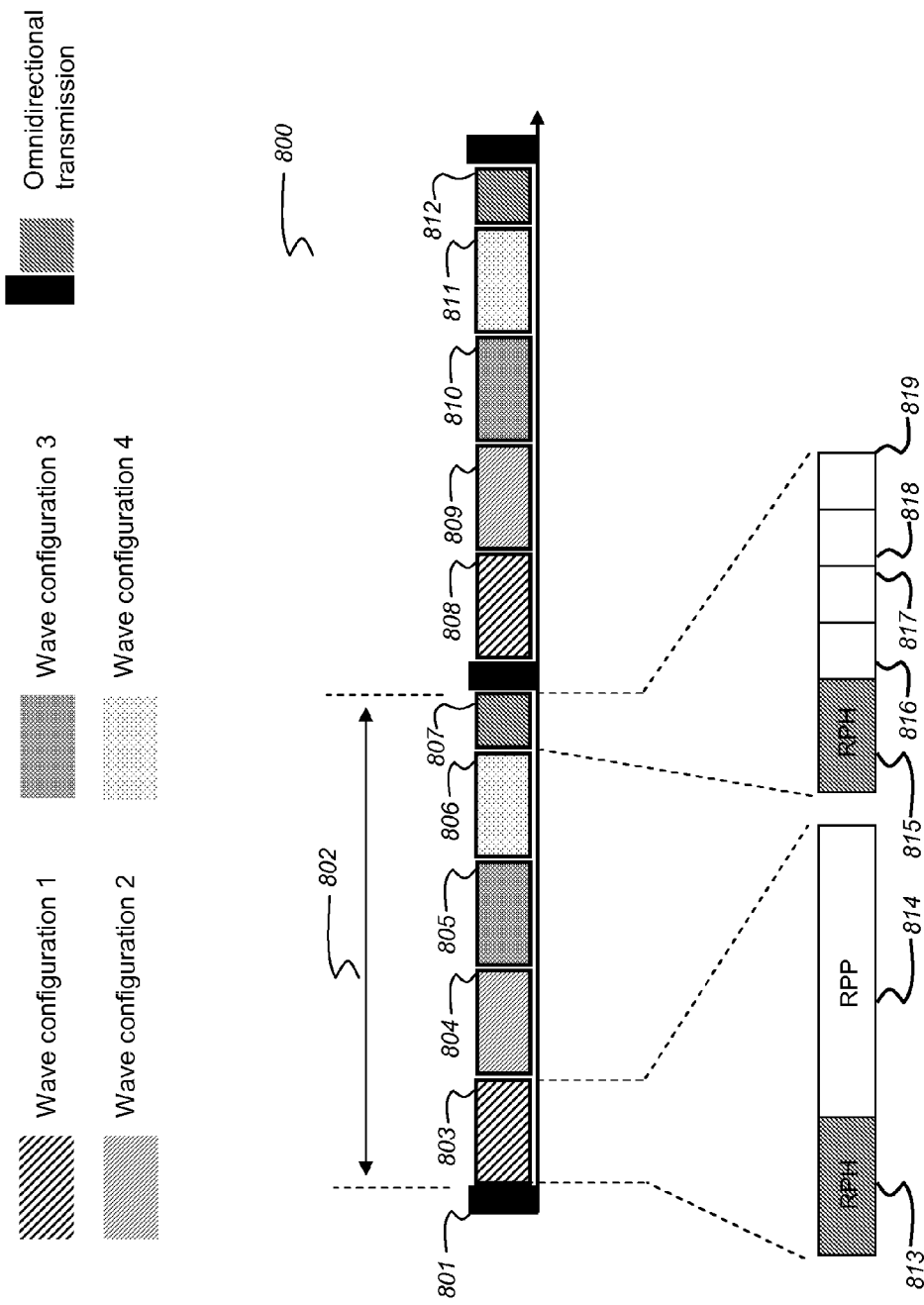
FIG. 8 presents the structure of a superframe and of data packets travelling on the paths of the network.

FIG. 8 presents the structure of a superframe (802) and of data packets travelling through the paths of the network. The source node synchronizes the communications by sending beacons (801). The source node transmits encoded data packets 803, 804, 805 and 806 each with a given antenna configuration. These packets consist of a header 813 and payload data 814. Within the superframe, the data packet 807 is used by the destination node in order to transmit the information on quality to the source node. Indeed, this packet constituted by a header 815 and four fields 816, 817, 818 and 819 will contain the information on quality of the four antenna configurations used by the source node to transmit the data packets.

Figure 9:
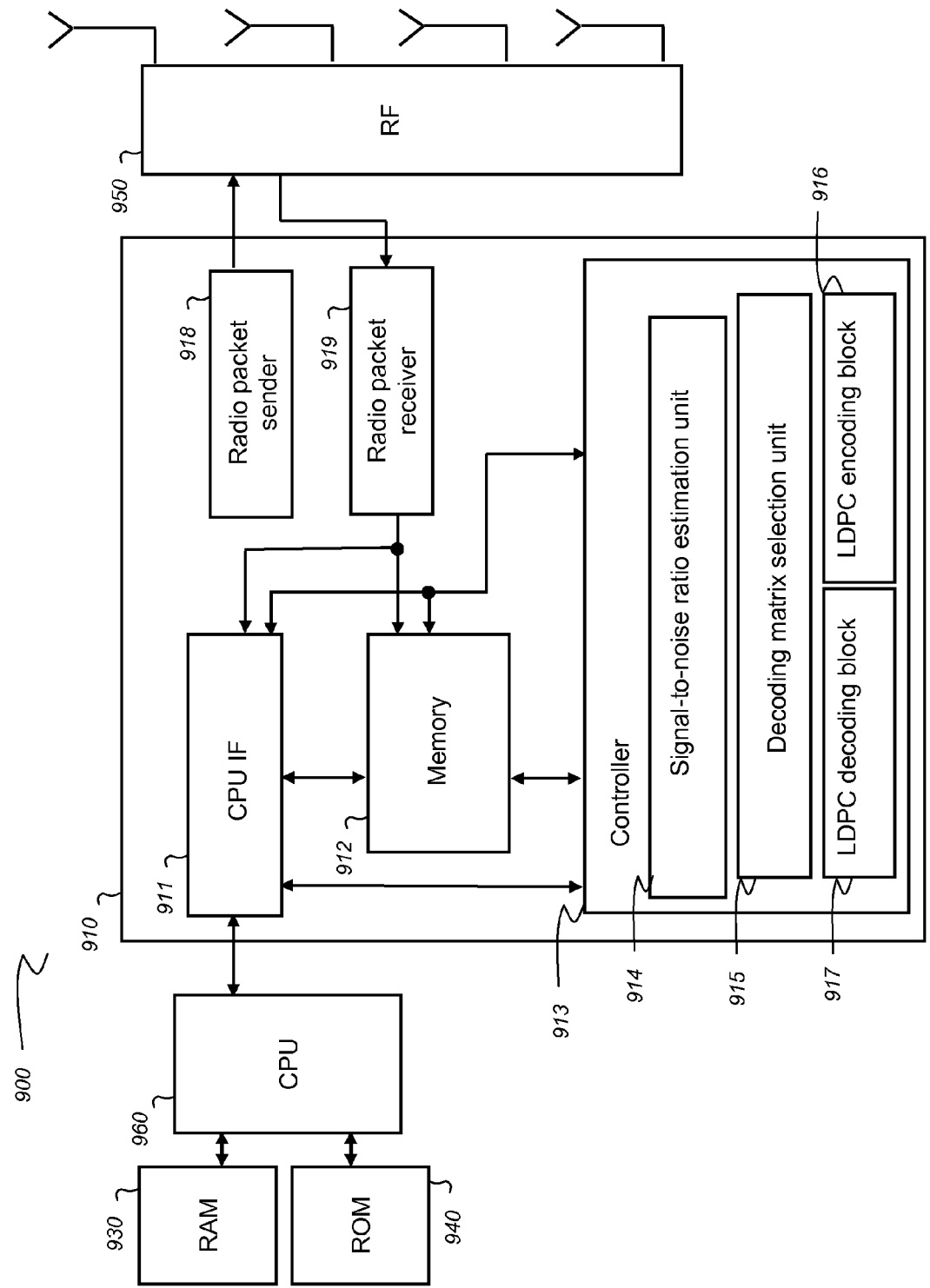
FIG. 9 presents the simplified structure of a node of the network implementing the method for configuring according to a particular embodiment of the invention.

FIG. 9 presents the simplified structure of a node of the network implementing the method for configuring according to one particular embodiment of the invention. This node has a RAM 930, a processor unit 960 equipped for example with a processor and driven by a computer program and stored in a ROM 940. The node can receive and send data packets through an RF block (950), a buffer memory (912) and data-packet sending (918) and receiving (919) blocks. At initialization, the code instructions of the computer program are for example loaded into a RAM 930 and then executed by the processors 960, 911.

The block 913 executes the method 400. It comprises:
  a block for estimating the signal-to-noise ratio (914);
  a block for selecting the decoding matrix (HH1 or HH2 for example) (915);
  a block for carrying out an LDPC decoding (917) as well as an LDPC encoding (916).

This FIG. 9 illustrates one particular way, amongst many possible ways, of performing the different algorithms described in detail here above with reference to FIGS. 4, 5, 6 and 7. Indeed, the technique of the invention can be performed equally well on:
  a re-programmable computing machine (for example a PC, a DSP or a micro-controller) executing a program comprising an instruction sequence, or
  a dedicated computation machine (for example a set of logic gates such as an FPGA or an ASIC).

The invention may be incorporated in a re-programmable computing machine, in which case the corresponding program (i.e. the sequence of instructions) could be stored in a detachable storage medium (for example a floppy, a CD-ROM or a DVD-ROM) or non-detachable storage medium, this storage medium being partially or totally readable by a computer or a processor.

What is claimed is:

1. A method for configuring an overall encoding scheme comprising a first encoding for generating first encoded packets from source packets and a second encoding for generating second encoded packets by combination of first encoded packets according to a combination scheme defining a number of second packets and from which first packets they are generated, applied by predetermined nodes of a network, the method comprising:
   obtaining a number N of defective paths among paths used to transmit the first and second encoded packets to at least one destination node, a path being defective if an associated quality of transmission is below a predetermined threshold; and
   selecting the combination scheme from among at least two possible predetermined combination schemes for which a number of encoded second packets is greater than or equal to N.

2. The method according to claim 1, wherein, among the N defective paths, a number N' of defective paths is allocated to the transmission of second encoded packets but not to the transmission of first encoded packets with s≤N'≤N, where s is a predetermined threshold.

3. The method according to claim 2, wherein the predetermined threshold s is equal to N so that the totality of the N defective paths is allocated to the transmission of second encoded packets but not to the transmission of first encoded packets.

4. A non-transitory computer-readable storage medium storing a program which, when executed by a computer, causes the computer to carry out a method for configuring an overall encoding scheme comprising a first encoding for generating first encoded packets from source packets and a second encoding for generating second encoded packets by combination of first encoded packets according to a combination scheme defining a number of second packets and from which first packets they are generated, applied by predetermined nodes of a network, the program comprising:
- a program portion which obtains a number N of defective paths among paths used to transmit the first and second encoded packets to at least one destination node, a path being defective if an associated quality of transmission is below a predetermined threshold; and
- a program portion which selects the combination scheme from among at least two possible predetermined combination schemes for which a number of encoded second packets is greater than or equal to N.

5. The non-transitory computer-readable storage medium storing the program according to claim 4, wherein, among the N defective paths, a number N' of defective paths is allocated to the transmission of second encoded packets but not to the transmission of first encoded packets with s≤N'≤N, where is a predetermined threshold.

6. The non-transitory computer-readable storage medium storing the program according to claim 4, wherein the predetermined threshold s is equal to N so that the totality of the N defective paths is allocated to the transmission of second encoded packets but not to the transmission of first encoded packets.

7. A device for configuring an overall encoding scheme comprising a first encoding for generating first encoded packets from source packets and a second encoding for generating second encoded packets by combination of first encoded packets according to a combination scheme defining a number of second packets and from which first packets they are generated, applied by predetermined nodes of a network, the device comprising:
- an obtaining unit which obtains a number N of defective paths among paths used to transmit the first and second encoded packets to at least one destination node, a path being defective if an associated quality of transmission is below a predetermined threshold; and
- a selecting unit which selects the combination scheme from among at least two possible predetermined combination schemes for which a number of encoded second packets is greater than or equal to N.

8. The device according to claim 7, wherein, among the N defective paths, a number N' of defective paths is allocated to the transmission of second encoded packets but not to the transmission of first encoded packets with s≤N'≤N, where s is a predetermined threshold.

9. The device according to claim 7, wherein the predetermined threshold s is equal to N so that the totality of the N defective paths is allocated to the transmission of second encoded packets but not to the transmission of first encoded packets.

* * * * *